(12) United States Patent
Dong et al.

(10) Patent No.: US 11,429,765 B2
(45) Date of Patent: Aug. 30, 2022

(54) MESHLESS METHOD FOR SOLID MECHANICS SIMULATION, ELECTRONIC DEVICE, AND STORAGE MEDIUM

(71) Applicant: Beihang University, Beijing (CN)

(72) Inventors: Leiting Dong, Beijing (CN); Tian Yang, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 146 days.

(21) Appl. No.: 16/926,311

(22) Filed: Jul. 10, 2020

(65) Prior Publication Data

US 2021/0012046 A1 Jan. 14, 2021

(30) Foreign Application Priority Data

Jul. 12, 2019 (CN) .......................... 201910629236.4

(51) Int. Cl.
*G06F 30/20* (2020.01)
*G06F 30/25* (2020.01)
*G06F 30/23* (2020.01)
*G06F 111/10* (2020.01)

(52) U.S. Cl.
CPC .............. *G06F 30/20* (2020.01); *G06F 30/23* (2020.01); *G06F 30/25* (2020.01); *G06F 2111/10* (2020.01)

(58) Field of Classification Search
CPC .......... G06F 30/20; G06F 30/25; G06F 30/23; G06F 2111/10
See application file for complete search history.

(56) References Cited

U.S. PATENT DOCUMENTS

| 2012/0226482 A1* | 9/2012 | Wu | .......................... G06F 30/23 |
| | | | 703/2 |
| 2015/0112653 A1* | 4/2015 | Wu | .......................... G06F 30/20 |
| | | | 703/2 |

OTHER PUBLICATIONS

Zwanenburg, P. and Nadarajah, S., 2016. Equivalence between the Energy Stable Flux Reconstruction and Filtered Discontinuous Galerkin Schemes: Numerical Validation. In 54th AIAA Aerospace Sciences Meeting (p. 1824). (Year: 2016).*
Han ZD, Rajendran AM, Atluri SN. Meshless local Petrov-Galerkin (MLPG) approaches for solving nonlinear problems with large deformations and rotations. Computer Modeling in Engineering and Sciences. Oct. 1, 2005;10(1):1. (Year: 2005).*
Wang, Z.J. and Gao, H., 2009. A unifying lifting collocation penalty formulation including the discontinuous Galerkin, spectral volume/ difference methods for conservation laws on mixed grids. Journal of Computational Physics, 228(21), pp. 8161-8186. (Year: 2009).*

(Continued)

*Primary Examiner* — Chuen-Meei Gan
(74) *Attorney, Agent, or Firm* — Mintz Levin Cohn Ferris Glovsky and Popeo, P.C.

(57) ABSTRACT

A meshless method for solid mechanics simulation, which includes the following steps: first constructing a trial function and a test function by distributing points according to a geometric shape of a structure; then introducing numerical flux to correct the traditional Galerkin weak form; and finally substituting the trial and test functions into the weak form to construct a global stiffness matrix of the structure and a system of algebraic equations, and solving the system of algebraic equations to obtain displacement and stress of each point, thus completing simulation and analysis of the structure deformation and stress.

17 Claims, 13 Drawing Sheets

(56) References Cited

OTHER PUBLICATIONS

Zhang T, He Y, Dong L, Li S, Alotaibi A, Atluri SN. Meshless local petrov-galerkin mixed collocation method for solving cauchy inverse problems of steady-state heat transfer. CMES: Computer Modeling in Engineering & Sciences. Feb. 1, 2014;97(6):509-53. (Year: 2014).*

Yang T, Dong L, Atluri SN. An elementarily simple Galerkin meshless method: The Fragile Points Method (FPM) using point stiffness matrices, for 2D Elasticity problems in complex domains. arXiv preprint arXiv: 1909.04149. 2019. (Year: 2019).*

* cited by examiner

MESHLESS METHOD FOR SOLID MECHANICS SIMULATION, ELECTRONIC DEVICE, AND STORAGE MEDIUM

CROSS REFERENCE TO RELATED APPLICATIONS

The present application claims priority to the Chinese Patent Application No. 201910629236.4 entitled "MESHLESS METHOD FOR SOLID MECHANICS SIMULATION, ELECTRONIC DEVICE, AND STORAGE MEDIUM", filed on Jul. 12, 2019, and incorporates its disclosure herein by reference in its entirety.

TECHNICAL FIELD

The present disclosure relates to a mechanics simulation system, and in particular, to a meshless method for solid mechanics simulation, an electronic device, and a storage medium.

BACKGROUND

Structural stress analysis is very important and necessary in diverse engineering fields, such as aeronautics, astronautics, automobile engineering, etc. From design, manufacture to maintenance of products, structural stress analysis always plays a crucial role. Because of its significance, numerous researchers have been focusing on improving the accuracy and efficiency of the process of structural stress analysis for decades.

Finite element method (FEM) is widely used in structural stress analysis at present. This method resorts to element-based, local, polynomial, and continuous trial and test functions for simulation. Because the trial and test functions are all polynomials, integrals in the FEM are easy to compute. Moreover, the symmetry and sparsity of a global stiffness matrix make the FEM suitable and efficient in large-scale structural simulations. However, the accuracy of the FEM highly depends on the quality of mesh. In order to obtain a satisfactory solution, a lot of efforts are usually spent on meshing. Further, even if simulation is initialized with a high-quality mesh structure, mesh distortion may occur in the FEM in the case of a large structural deformation, dramatically reducing the precision of the solution. Further, in order to enable FEM to investigate the formation of cracks, and the rupture and fragmentation of structures, it is necessary to repeatedly perform re-meshing, element deletion or use a cohesion model. However, these additional means render the FEM time-consuming and laborious in calculating extreme problems, and the result is not accurate enough.

Meshless methods, which eliminate meshes partly or completely, have been developed since the end of last century. The meshless method is mainly classified into two types: a meshless weak form method and a meshless particle method. Element-free Galerkin (EFG) and Meshless Local Petrov-Galerkin (MLPG) are two typical meshless weak-form methods, which mainly utilize Moving Least Squares (MLS) or Radial Basis Function (RBF) approximations to deduce point-based trial functions. The use of the MLS and RBF approximations makes it easy to achieve higher-order continuity of the functions. Besides, by replacing the mesh structure with individual points, the meshless method can conveniently insert or remove additional points. However, on the other hand, the trial functions obtained by the MLS or RBF method are no longer polynomial functions, and are rather complex. Therefore, the integral calculations in both EFG and MLPG are extremely cumbersome, less accurate, and may even influence the precision and stability of the whole method. Definitely, to reduce the computational cost and improve the accuracy of integration, some special, novel numerical integration methods, for example, a series of novel nodal integration methods, are necessarily adopted.

Smoothed Particle Hydrodynamics (SPH) method, as a meshless particle method, is simple in form and needs less computational cost. However, the SPH method is based on strong form rather than weak form. This method has poor stability and is prone to problems such as tensile instability. As another example, Peridynamics method is a relatively new method, but the theoretical basis thereof is different from the traditional continuum mechanics. Classic constitutive models and engineering experiences accumulated by scientists and engineers for decades are difficult to be directly used in the Peridynamics method.

SUMMARY

To overcome the shortcomings in the prior art, a first objective of embodiments is to provide a meshless method for solid mechanics simulation which can improve calculation efficiency and simulation precision, and solve the problem that traditional numerical methods are difficult to simulate some extreme problems such as rupture and fragmentation.

A second objective of the embodiments is to provide an electronic device, which can improve calculation efficiency and simulation precision, and solve the problem that traditional numerical methods are difficult to simulate some extreme problems such as rupture and fragmentation.

A third objective of the embodiments is to provide a computer-readable storage medium, which can improve calculation efficiency and simulation precision, and solve the problem that traditional numerical methods are difficult simulate some extreme problems such as rupture and fragmentation.

The first objective is implemented through the following technical solution:

A meshless method for solid mechanics simulation includes the following steps:

a step of constructing a trial function and a test function, wherein obtaining expressions of the trial function and the test function with point displacements in each subdomain according to points distributed in a structure;

a step of developing a Galerkin weak form, wherein introducing numerical flux corrections to obtain a Galerkin weak form with the numerical flux corrections;

a step of generating and solving a system of algebraic equations, wherein constructing a global stiffness matrix of the structure and a system of algebraic equations according to the expressions of the trial and test functions in each subdomain and the Galerkin weak form with the numerical flux corrections, and solving the system of algebraic equations to obtain the displacement of each point; and a step of calculating structural deformation and stress, wherein calculating the deformation and the stress of each position in the structure according to the displacement of each point, to complete simulation and analysis of the structure.

In some embodiments, the method further includes a simulating step for according to a set sequence of loads in chronological order, performing the step of constructing trial functions and test functions, the step of developing the Galerkin weak form, the step of generating and solving a system of algebraic equations, and the step of calculating structural deformation and stress under each load successively, to obtain the deformation and stress of each position in the structure; and determining, according to a certain criterion, whether there is a crack between neighboring subdomains in the structure, to simulate rupture and fragmentation of the structure under the effect of the sequence of loads in chronological order.

In some embodiments, each subdomain contains one point.

In some embodiments, a process of constructing the trial function and the test function is as follows:

step S11: first defining the trial function in each subdomain and recording the trial function as $u^h$, where the trial function is an nth-order polynomial function, and n is a natural number greater than or equal to 1 and often equal to 1; and performing nth-order Taylor expansion of the trial function at a point $P_0$, as shown in the following formula (1):

$$u^k(x, y) = \begin{bmatrix} u_x^h \\ u_y^h \end{bmatrix} = \begin{bmatrix} u_x^0 + \frac{\partial u_x}{\partial x}\bigg|_{P_0}(x - x_0) + \frac{\partial u_x}{\partial y}\bigg|_{P_0}(y - y_0) + \ldots + \\ \frac{1}{n!}\frac{\partial^n u_x}{\partial y^n}(y - y_0)^n \\ u_y^0 + \frac{\partial u_y}{\partial x}\bigg|_{P_0}(x - x_0) + \frac{\partial u_y}{\partial y}\bigg|_{P_0}(y - y_0) + \ldots + \\ \frac{1}{n!}\frac{\partial^n u_y}{\partial y^n}(y - y_0)^n \end{bmatrix}, \quad (1)$$

where $[u_x^0 \ u_y^0]^T$ is value of the displacement $u^h$ at the point $P_0$, and $$a = \begin{bmatrix} \frac{\partial u_x}{\partial x}\bigg|_{P_0} & \frac{\partial u_x}{\partial y}\bigg|_{P_0} & \ldots & \frac{\partial^n u_x}{\partial y^n}\bigg|_{P_0} & \frac{\partial u_y}{\partial x}\bigg|_{P_0} & \frac{\partial u_y}{\partial y}\bigg|_{P_0} & \ldots & \frac{\partial^n u_y}{\partial y^n}\bigg|_{P_0} \end{bmatrix}$$

is a displacement gradient from the first order to the nth order at the point $P_0$;

step S12: determining the support domain of each subdomain, and defining a weighted discrete $L^2$ norm J, where $$J = (Aa + u_0 - u_m)^T W(Aa + u_0 - u_m); \quad (2)$$

$$A = \begin{bmatrix} x_1 - x_0 & y_1 - y_0 & \ldots & \frac{1}{n!}(y_1 - y_0)^n & 0 & 0 & \ldots & 0 \\ 0 & 0 & \ldots & 0 & x_1 - x_0 & y_1 - y_0 & \ldots & \frac{1}{n!}(y_1 - y_0)^n \\ x_2 - x_0 & y_2 - y_0 & \ldots & \frac{1}{n!}(y_2 - y_0)^n & 0 & 0 & \ldots & 0 \\ 0 & 0 & \ldots & 0 & x_2 - x_0 & y_2 - y_0 & \ldots & \frac{1}{n!}(y_2 - y_0)^n \\ \vdots & \vdots & \vdots & \vdots & \vdots & \vdots & \vdots & \vdots \\ x_m - x_0 & y_m - y_0 & \ldots & \frac{1}{n!}(y_m - y_0)^n & 0 & 0 & \ldots & 0 \\ 0 & 0 & \ldots & 0 & x_m - x_0 & y_m - y_0 & \ldots & \frac{1}{n!}(y_m - y_0)^n \end{bmatrix}$$

$$u_0 = \left( \begin{bmatrix} u_x^0 & u_y^0 & u_x^0 & u_y^0 & \ldots & u_x^0 & u_y^0 \end{bmatrix}_{1 \times 2m} \right)^T,$$

$$u_m = \begin{bmatrix} u_x^1 & u_y^1 & u_x^2 & u_y^2 & \ldots & u_x^m & u_y^m \end{bmatrix}^T,$$

$$W = \begin{bmatrix} w_x^1 & 0 & 0 & \ldots & 0 \\ 0 & w_y^1 & \ddots & \ddots & \vdots \\ 0 & \ddots & \ddots & \ddots & 0 \\ \vdots & \ddots & \ddots & w_x^m & 0 \\ 0 & \ldots & 0 & 0 & w_y^m \end{bmatrix},$$

($x_i$, $y_i$) is coordinates of a point $P_i$, $[u_x^i \ u_y^i]^T$ is value of the displacement $u^h$ at the point $P_i$, and $[w_x^i \ w_y^i]^T$ is value of a weight at the point $P_i$, (i=1, 2, 3, ... m).

step S13: expressing the displacement gradient a with the point displacement according to the formula (2) and stationary conditions of the norm J, that is:

$$a = Cu_E, \quad (3)$$

wherein $C = (A^T W A)^{-1} A^T W [I_1 \ I_2]$, $u_E = [u_x^0 \ u_y^0 \ u_x^1 \ u_y^1 \ ... \ u_x^m \ u_y^m]^T$, $$I_1 = \begin{bmatrix} -1 & 0 \\ 0 & -1 \\ -1 & 0 \\ 0 & -1 \\ \vdots & \vdots \\ -1 & 0 \\ 0 & -1 \end{bmatrix}_{2m \times 2}, \text{ and } I_2 = \begin{bmatrix} 1 & 0 & \cdots & 0 \\ 0 & 1 & \ddots & \vdots \\ \vdots & \ddots & \ddots & 0 \\ 0 & \cdots & 0 & 1 \end{bmatrix}_{2m \times 2m};$$

step S14: obtaining the expression of the trial function in each subdomain according to formulae (3) and (1); and step S15: obtaining the expression of the test function by prescribing the test function in the same form as that of the trial function.

In some embodiments, a definition of the support domain includes, but is not limited to, any one of the following manners: defining the support domain of each point to contain all subdomains having points adjacent to the corresponding point located therein, or defining the support domain of each point to contain all subdomains having points therein which are located in a circle of a particular size and with the corresponding point at the center; and if a crack exists between neighboring subdomains, the point located on one side of the crack is not contained in the support domain of the point on the other side of the crack.

In some embodiments, the numerical flux corrections include, but are not limited to, interior penalty numerical flux corrections.

In some embodiments, the step of generating and solving an system of algebraic equations further includes:

step S21: substituting the trial and test functions in each subdomain into the Galerkin weak form corrected by numerical fluxes, to obtain a point stiffness matrix and an internal-boundary stiffness matrix, where the point stiffness matrix is $K_E = \int_E B^T D B d\Omega$, the internal-boundary stiffness matrix is $$K_h = -\int_e [N^T]\{n_e DB\} d\Gamma - \int_e \{B^T Dn_e^T\}[N] d\Gamma + \frac{\eta}{h_e} \int_e [N^T][N] d\Gamma,$$

and e is a common boundary between two neighboring subdomains;

step S22: obtaining a global stiffness matrix K by assembling all the point stiffness matrices and the internal-boundary stiffness matrices, to obtain the following system of algebraic equations in a matrix form: Kq=Q, where q is a point displacement vector, and Q is a load vector; and step S23: solving the system of algebraic equations according to the global stiffness matrix and the load vector to obtain a point displacement vector of the structure, thus finally obtaining a displacement of each position in the structure.

The second objective is implemented through the following technical solution:

An electronic device includes a memory, a processor, and a computer program stored in the memory and executable in the processor, where the processor implements the steps in the above meshless method for solid mechanics simulation when executing the program.

The third objective is implemented through the following technical solution:

A computer-readable storage medium which stores a computer program is provided. When executed by a processor, the computer program implements the steps in the above meshless method for solid mechanics simulation.

The present disclosure has the following advantageous effects compared to the prior art:

The present disclosure forms a novel meshless method for solid mechanics simulation by providing new discontinuous trial and test functions and a corresponding weak form, which can improve calculation efficiency and simulation precision, and solve the problem that traditional numerical methods are difficult to simulate some extreme problems such as rupture and fragmentation.

DETAILED DESCRIPTION

The present disclosure will be further described below with reference to the accompanying drawings and specific embodiments. It should be noted that, provided that there is no conflict, new embodiments can be formed by arbitrarily combining various embodiments or various technical features described below.

A meshless method for solid mechanics simulation specifically includes the following three parts:

Part 1: Constructing a trial function and test a function.

Figure 1:
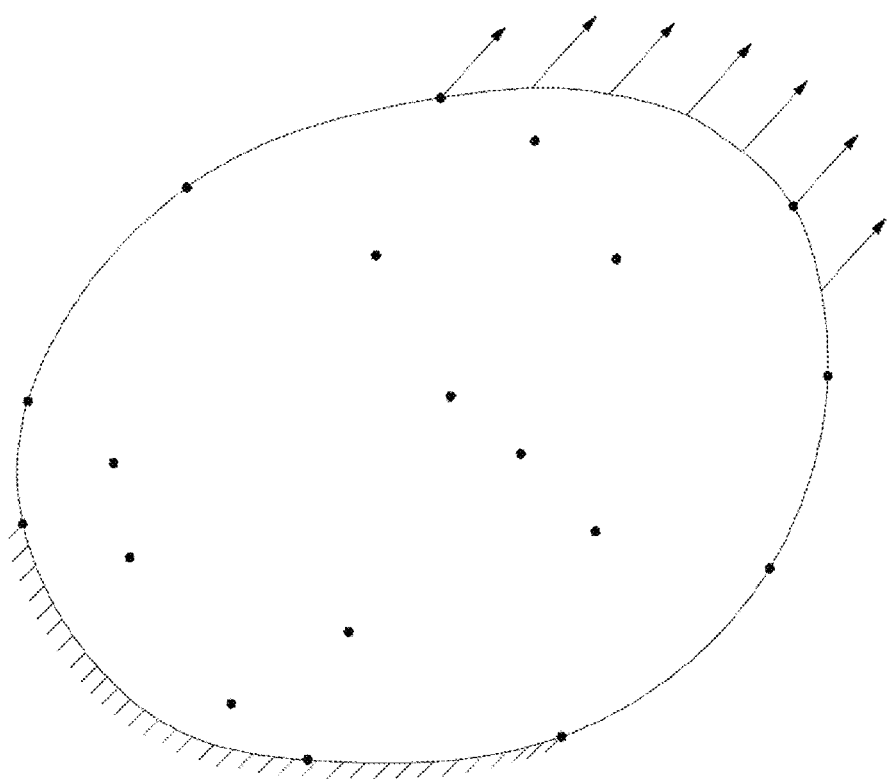
FIG. 1 is a schematic diagram of a structure and points randomly distributed therein provided by the present disclosure.
Figure 2:
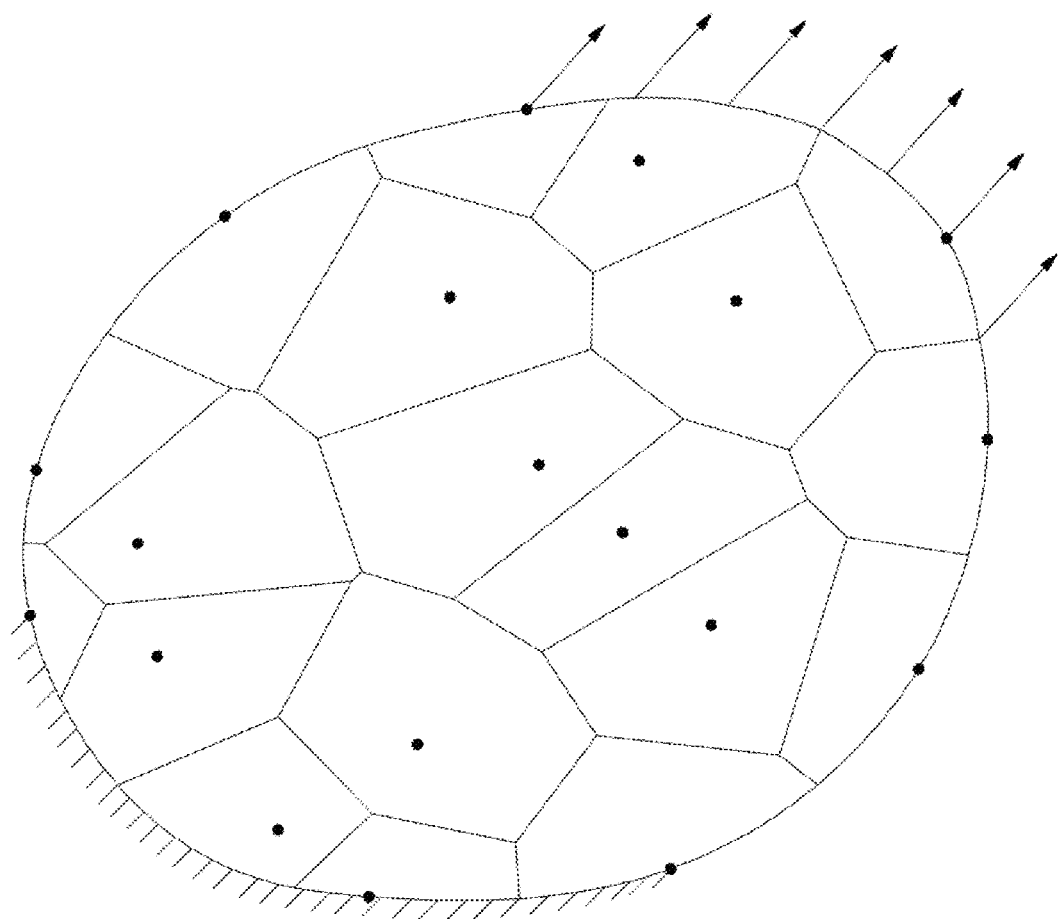
FIG. 2 is a schematic diagram of the structure and division of subdomains thereof provided by the present disclosure.

For a solid structure of a given shape shown in FIG. 1, several points are distributed inside the structure and on its boundary. As shown in FIG. 2, with these points, the structure is divided into a set of arbitrarily shaped subdomains, and each subdomain contains one point. The present disclosure does not limit the division of subdomains, merely requiring each subdomain to contain one point. For example, a Voronoi Diagram method can be adopted herein.

The trial function and the test function are constructed based on these distributed points and their subdomains, which specifically includes the following steps.

Step A11: First, a polynomial trial function $u^h$ (namely, a displacement field, which refers to a displacement of the structure from before to after deformation) is defined for each subdomain. This trial function may be a first, second, third, or higher-order polynomial function.

For example, as shown in the following formula (1), nth-order Taylor expansion is performed on the trial function at point $P_0$:

$$u^h(x, y) = \begin{bmatrix} u_x^h \\ u_y^h \end{bmatrix} = \begin{bmatrix} u_x^0 + \frac{\partial u_x}{\partial x}\big|_{P_0}(x-x_0) + \frac{\partial u_x}{\partial y}\big|_{P_0}(y-y_0) + \ldots + \\ \frac{1}{n!}\frac{\partial^n u_x}{\partial y^n}(y-y_0)^n \\ u_y^0 + \frac{\partial u_y}{\partial x}\big|_{P_0}(x-x_0) + \frac{\partial u_y}{\partial y}\big|_{P_0}(y-y_0) + \ldots + \\ \frac{1}{n!}\frac{\partial^n u_y}{\partial y^n}(y-y_0)^n \end{bmatrix}, \quad (1)$$

where $[u_x^0\ u_y^0]^T$ is value of the displacement $u^h$ at the point $P_0$, and $$a = \begin{bmatrix} \frac{\partial u_x}{\partial x}\big|_{P_0} & \frac{\partial u_x}{\partial y}\big|_{P_0} & \ldots & \frac{\partial^n u_x}{\partial y^n}\big|_{P_0} & \frac{\partial u_y}{\partial x}\big|_{P_0} & \frac{\partial u_y}{\partial y}\big|_{P_0} & \ldots & \frac{\partial^n u_y}{\partial y^n}\big|_{P_0} \end{bmatrix}$$

is a displacement gradient from the first order to the nth order at the point $P_0$.

When n=1, that is, when the trial function is a first-order function, the trial function $u^h$ of the subdomain $E_0$ which contains the point $P_0$ may be expressed as follows:

$$u^h(x, y) = \qquad (1)$$

$$\begin{bmatrix} u_x^h \\ u_y^h \end{bmatrix} = \begin{bmatrix} u_x^0 + \frac{\partial u_x}{\partial x}\big|_{P_0}(x-x_0) + \frac{\partial u_x}{\partial y}\big|_{P_0}(y-y_0) \\ u_y^0 + \frac{\partial u_y}{\partial x}\big|_{P_0}(x-x_0) + \frac{\partial u_y}{\partial y}\big|_{P_0}(y-y_0) \end{bmatrix} (x, y) \in E_0,$$

where $u^h(x, y)$ is value of $u^h$ at point $(x, y)$, $(x_0, y_0)$ is the coordinates of the point $P_0$, $[u_x^0\ u_y^0]^T$ is the value of $u^h$ at the point $P_0$, and the displacement gradient at the point $P_0$ is $$a = \begin{bmatrix} \frac{\partial u_x}{\partial x} & \frac{\partial u_x}{\partial y} & \frac{\partial u_y}{\partial x} & \frac{\partial u_y}{\partial y} \end{bmatrix}^T \bigg|_{P_0}$$

In order to express the trial function with point displacements, it is required to express the displacement gradient with the point displacements. The point displacements refer to displacements by which the point displaces, for example, displacements of black points in FIGS. 2 and 3.

Figure 3:
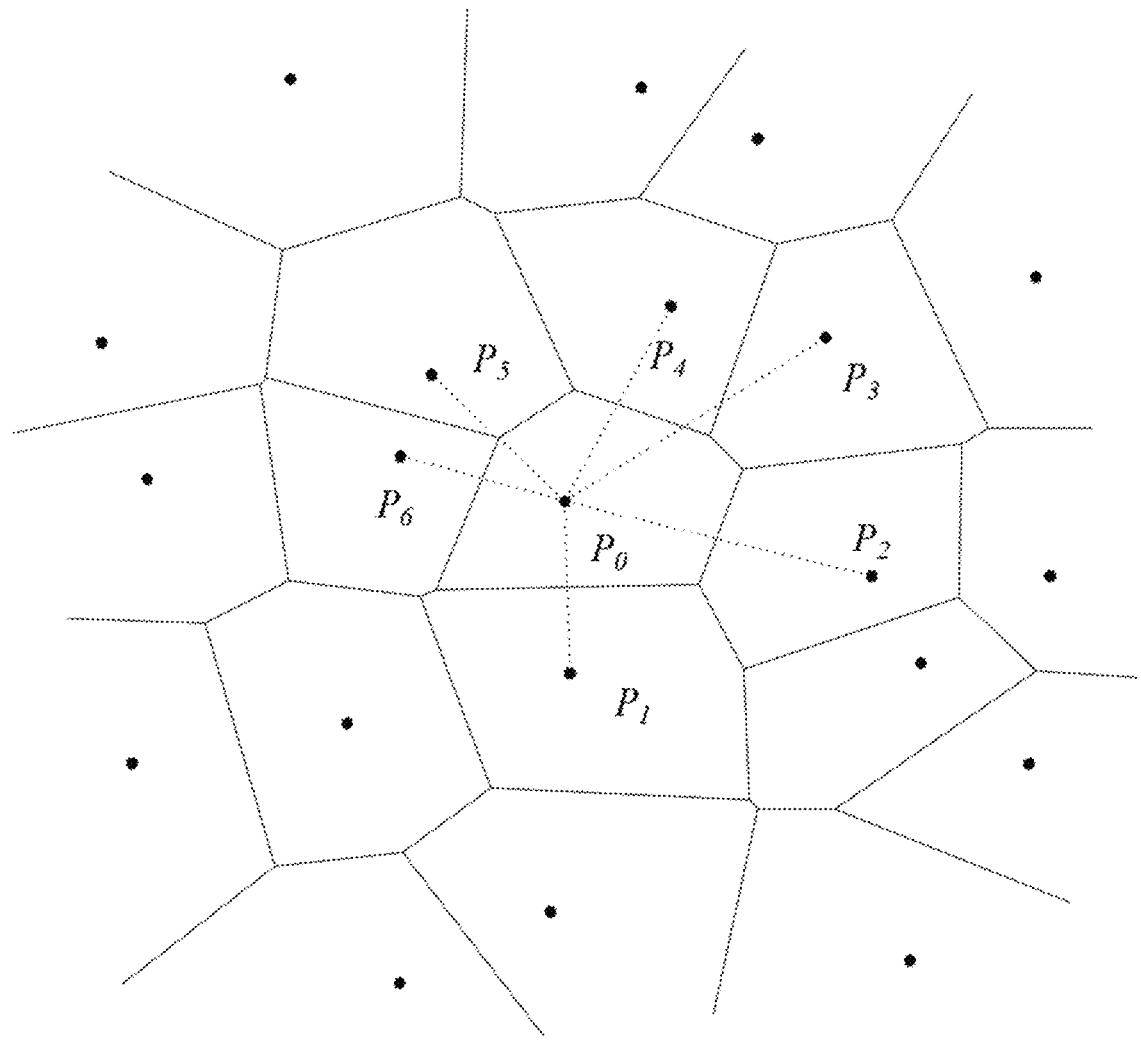
FIG. 3 is a schematic diagram of a support domain of point $P_0$ provided by the present disclosure.

To express the displacement gradient with the point displacements, first it is required to set the support domain for each point. In the present disclosure, the support domain may be defined in many manners, for example, the support domain of each point is defined to contain all subdomains having points adjacent to the corresponding point located therein, as shown in FIG. 3. Definitely, the following definition may also be adopted: defining the support domain of each point to contain all subdomains having points therein which are located in a circle of a particular size and with the corresponding point at the center. In addition, if a crack exists between neighboring subdomains, the point located on one side of the crack is not contained in the support domain of the point on the other side of the crack.

Step A12: The support domain of each subdomain is determined, and a weighted discrete $L^2$ norm J is defined, where $$J = (Aa + u_0 - u_m)^T W (Aa + u_0 - u_m), \qquad (2)$$

$$A = \begin{bmatrix} x_1-x_0 & y_1-y_0 & \ldots & \frac{1}{n!}(y_1-y_0)^n & 0 & 0 & \ldots & 0 \\ 0 & 0 & \ldots & 0 & x_1-x_0 & y_1-y_0 & \ldots & \frac{1}{n!}(y_1-y_0)^n \\ x_2-x_0 & y_2-y_0 & \ldots & \frac{1}{n!}(y_2-y_0)^n & 0 & 0 & \ldots & 0 \\ 0 & 0 & \ldots & 0 & x_2-x_0 & y_2-y_0 & \ldots & \frac{1}{n!}(y_2-y_0)^n \\ \vdots & \vdots & \vdots & \vdots & \vdots & \vdots & \vdots & \vdots \\ x_m-x_0 & y_m-y_0 & \ldots & \frac{1}{n!}(y_m-y_0)^n & 0 & 0 & \ldots & 0 \\ 0 & 0 & \ldots & 0 & x_m-x_0 & y_m-y_0 & \ldots & \frac{1}{n!}(y_m-y_0)^n \end{bmatrix}$$

$$u_0 = \left(\begin{bmatrix} u_x^0 & u_y^0 & u_x^0 & u_y^0 & \ldots & u_x^0 & u_y^0 \end{bmatrix}_{1 \times 2m}\right)^T,$$

$$u_m = \begin{bmatrix} u_x^1 & u_y^1 & u_x^2 & u_y^2 & \ldots & u_x^m & u_y^m \end{bmatrix}^T,$$

$$W = \begin{bmatrix} w_x^1 & 0 & 0 & \cdots & 0 \\ 0 & w_y^1 & \ddots & \ddots & \vdots \\ 0 & \ddots & \ddots & \ddots & 0 \\ \vdots & \ddots & \ddots & w_x^m & 0 \\ 0 & \cdots & 0 & 0 & w_y^m \end{bmatrix},$$

$(x_i, y_i)$ is coordinates of the point $P_i$, $[u_x^i \ u_y^i]^T$ is value of the displacement $u^h$ at the point $P_i$, and $[w_x^i \ w_y^i]^T$ is value of a weight function at the point $P_i$, ($i=1, 2, 3, \ldots$ m).

Step A13: The displacement gradient a is expressed with the point displacements according to the formula (2) and stationary conditions of the norm J, that is:

$$a = Cu_E, \qquad (3)$$

wherein $C = (A^T W A)^{-1} A^T W [I_1 \ I_2]$, $u_E = [u_x^0 \ u_y^0 \ u_x^1 \ u_y^1 \ \ldots \ u_x^m \ u_y^m]^T$, $$I_1 = \begin{bmatrix} -1 & 0 \\ 0 & -1 \\ -1 & 0 \\ 0 & -1 \\ \vdots & \vdots \\ -1 & 0 \\ 0 & -1 \end{bmatrix}_{2m \times 2}, \text{ and } I_2 = \begin{bmatrix} 1 & 0 & \cdots & 0 \\ 0 & 1 & \ddots & \vdots \\ \vdots & \ddots & \ddots & 0 \\ 0 & \cdots & 0 & 1 \end{bmatrix}_{2m \times 2m};$$

Step A14: The following expression of the trial function in each subdomain is obtained according to formulae (3) and (1):

$$u^h = Nu_E, \qquad (4)$$

$$N = \begin{bmatrix} x - x_0 & y - y_0 & 0 & 0 \\ 0 & 0 & x - x_0 & y - y_0 \end{bmatrix} C + I_3$$

where $$= \begin{bmatrix} N_0 & 0 & N_1 & 0 & \cdots & N_m & 0 \\ 0 & N_0 & 0 & N_1 & \cdots & 0 & N_m \end{bmatrix}_{2 \times (2m+2)},$$

and N is referred to as a shape function herein; and $$I_3 = \begin{bmatrix} 1 & 0 & 0 & \cdots & 0 \\ 0 & 1 & 0 & \cdots & 0 \end{bmatrix}_{2 \times (2m+2)}.$$

The test function and the trial function are stipulated to have expressions of an identical form, that is, they have the same shape function. Therefore, the following expression of the test function v can be obtained by the same method: $v = Nv_E$ (5).

Thus, according to the relationship between the displacement field and strain and stress fields, the strain field $\varepsilon^h$ and the stress field $\sigma^h$ can be expressed with the trial functions and the test functions respectively as follows:

$$\varepsilon^h = \begin{bmatrix} \varepsilon_x^h \\ \varepsilon_y^h \\ \gamma_{xy}^h \end{bmatrix} = \begin{bmatrix} \frac{\partial}{\partial x} & 0 \\ 0 & \frac{\partial}{\partial y} \\ \frac{\partial}{\partial y} & \frac{\partial}{\partial x} \end{bmatrix} u^h = \begin{bmatrix} 1 & 0 & 0 & 0 \\ 0 & 0 & 0 & 1 \\ 0 & 1 & 1 & 0 \end{bmatrix} Cu_E = Bu_E$$

$$\sigma^h = \begin{bmatrix} \sigma_x^h \\ \sigma_y^h \\ \sigma_{xy}^h \end{bmatrix} = D \begin{bmatrix} \varepsilon_x \\ \varepsilon_y \\ \gamma_{xy} \end{bmatrix} = DBu_{E^-},$$

where D is a material stiffness matrix and is related to a material property of the structure, and the material property may be isotropy, orthotropy, anisotropy or another property.

Part 2: Introducing numerical flux to correct the Galerkin weak form.

Expressions of trial and test functions of the whole structure can be obtained according to the expressions of the trial and test functions of each subdomain.

The trial function and the test function of each subdomain are continuous within the subdomain. However, for the whole structure, because the subdomains have different displacement fields on a common boundary, the trial function and the test function are discontinuous in the whole structure.

Figure 4:
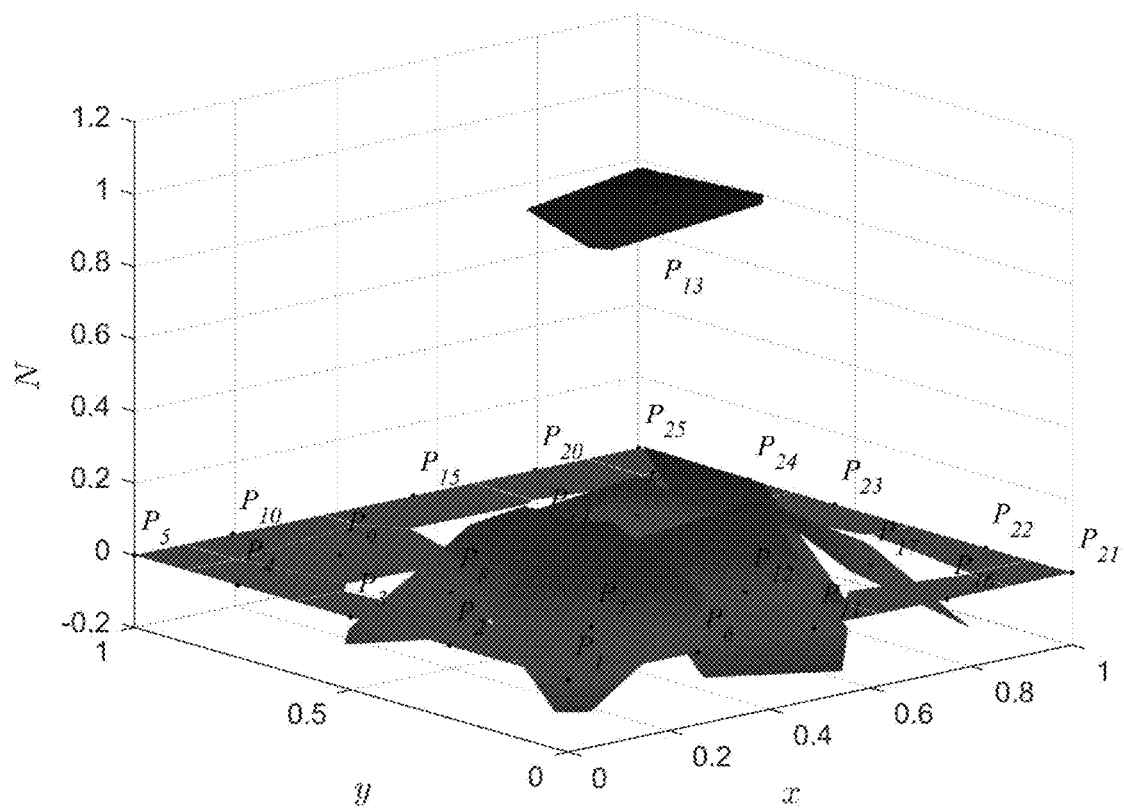
FIG. 4 is a schematic diagram of a discontinuous shape function provided by the present disclosure.
Figure 5:
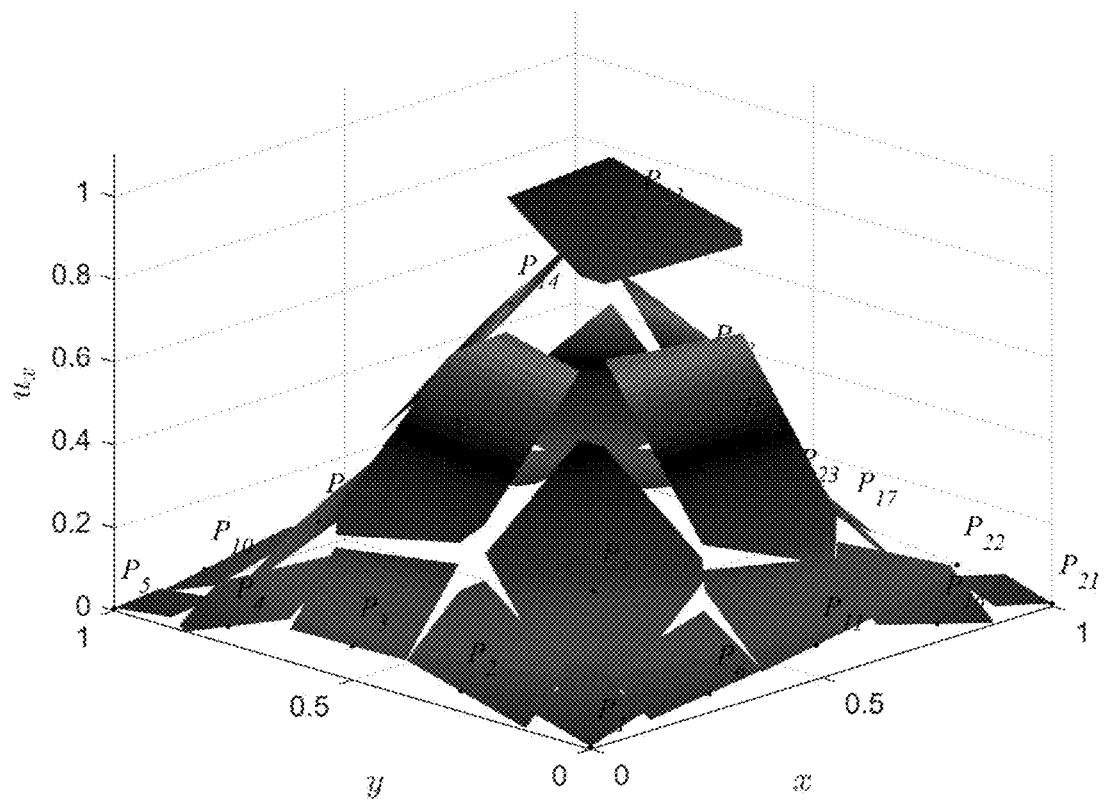
FIG. 5 is a schematic diagram of a discontinuous trial function provided by the present disclosure.

For example, FIG. 5 is a schematic diagram of the trial function, and it can be seen from the figure that the trial function in the whole structure is discontinuous. FIG. 4 is a schematic diagram of a shape function of a point, and likewise the shape function is also discontinuous.

The present disclosure is developed to be applied in the existing EFG method, and the existing Galerkin weak form has the following formula:

$$\sum_{E \in \Omega} \int_E \sigma_{ij}(u)\varepsilon_{ij}(v)d\Omega = \sum_{E \in \Omega} \int_E f_i v_i d\Omega + \sum_{e \in \Gamma_t} \int_e \bar{t}_i v_i d\Gamma. \qquad (6)$$

However, because the trial and test functions of neighboring subdomains given by the present disclosure are discontinuous, mathematical inconsistency will be caused if the trial and test functions of each subdomain calculated in the present disclosure are directly used in the formula of the Galerkin weak form, finally resulting in instability of calculation results.

To resolve the instability of the calculation results that is caused by the discontinuity of the trial and test functions, the present disclosure introduces numerical flux corrections to correct the existing Galerkin weak form.

The numerical flux corrections in the present disclosure may be of multiple types. Due to being capable of limiting discontinuity of a function on an internal boundary, the numerical flux correction can be introduced herein to resolve the instability of numerical results caused by the discontinuity of the trial function.

This embodiment uses interior penalty numerical flux corrections as an example to correct the existing Galerkin weak form. The following formula (7) indicates the Galerkin weak form with the interior penalty (IP) numerical flux corrections. In the formula (7), traction boundary conditions and displacement continuity conditions of the internal boundary are imposed weakly, while displacement boundary conditions are required to be imposed strongly:

$$\sum_{E\in\Omega}\int_E \sigma_{ij}(u)\varepsilon_{ij}(v)d\Omega - \sum_{e\in\Gamma_k}\int_e \{\sigma_{ij}(u)n_j^e\}[v_i]d\Gamma - \sum_{e\in\Gamma_k}\int_e \{\sigma_{ij}(v)n_j^e\}[u_i]d\Gamma + \quad (7)$$

$$\sum_{e\in\Gamma_k}\frac{\eta}{h_e}\int_e [u_i][v_i]d\Gamma = \sum_{E\in\Omega}\int_E f_i v_i d\Omega + \sum_{e\in\Gamma_k}\int_e \bar{t}_i v_i d\Gamma.$$

In the formula, $\Gamma_u$ is the displacement boundary, $\Gamma_t$ is the traction boundary, { } is an average operator, and [ ] is a jump operator. When e is the internal boundary (a common boundary between subdomains $E_1$ and $E_2$), $n_j^e$ indicates a unit normal vector pointing from $$E_1 \text{ to } E_2, [w] = w\big|_e^{E_1} - w\big|_e^{E_2}, \text{ and } \{w\} = \frac{1}{2}\left(w\big|_e^{E_1} + w\big|_e^{E_2}\right).$$

It can be known from the above that, by comparison between the formula (7) indicating the Galerkin weak form with the IP numerical flux corrections provided by the present disclosure and the formula (6) indicating the traditional Galerkin weak form, their difference lies in that the former has a jump and an average operator on the common boundary, thus resolving the inconsistency of numerical results caused by the discontinuity of the trial and test functions.

Part 3: Substituting the expressions of the trial and test functions in each subdomain into the Galerkin weak form with the numerical flux corrections, to construct a global stiffness matrix of the structure and a system of algebraic equations; calculating the displacement of each point in the structure according to the system of algebraic equations; and afterwards, calculating deformation and stress of each position in the structure according to the displacement of each point in the structure, completing simulation calculation for the structure.

Step B1: First, the trial and test functions in each subdomain are substituted into the Galerkin weak form with the numerical flux corrections, that is, the trial and test functions in each subdomain are substituted into the formula (7), to obtain a point stiffness matrix of each point and an internal-boundary stiffness matrix.

Where the point stiffness matrix is $K_E = \int_E B^T DB d\Omega$, the internal-boundary stiffness matrix is $$K_h = -\int_e [N^T]\{n_e DB\}d\Gamma - \int_e \{B^T D n_e^T\}[N]d\Gamma + \frac{\eta}{h_e}\int_e [N^T][N]d\Gamma,$$

and e is a common boundary between subdomains.

Step B2: The global stiffness matrix K of the structure is obtained by assembling the point stiffness matrix of each point and the internal-boundary stiffness matrix, to obtain a system of algebraic equations in a matrix form:

$$Kq=Q \quad (8),$$

where q is a point displacement vector to be solved, Q is a load vector, and K is the global stiffness matrix obtained by assembling all the point stiffness matrices and the internal-boundary stiffness matrices.

Step B3: The system of algebraic equations shown by the formula (8) is solved according to the global stiffness matrix of the structure and a current load vector, to obtain a displacement vector of each point in the structure, namely, a displacement of each point.

Step B4: Displacements of each position in the structure are obtained according to the displacement of each point, and strain and stress of each position in the structure is obtained according to the relationship between the displacement and the stress.

By the present disclosure, analysis results regarding structural deformation and stress can be obtained. When the analysis results are applied in a structural design, it can be determined whether designs of object structures such as mechanical and civil engineering structures are safe and reasonable.

The load, which may be a single load condition or a load history, refers to a force imposed on a structure in a working status. The same structure has different deformations and stresses under the effect of different loads. If the present disclosure is applied in a structure subjected to a load history in a working status, this load history may be divided into m load steps. In each load step, deformation and displacement are calculated and crack generation and propagation are simulated.

The present disclosure further provides a calculation process of structural strain and stress with reference to specific drawings.

Embodiment 1

Figure 7:
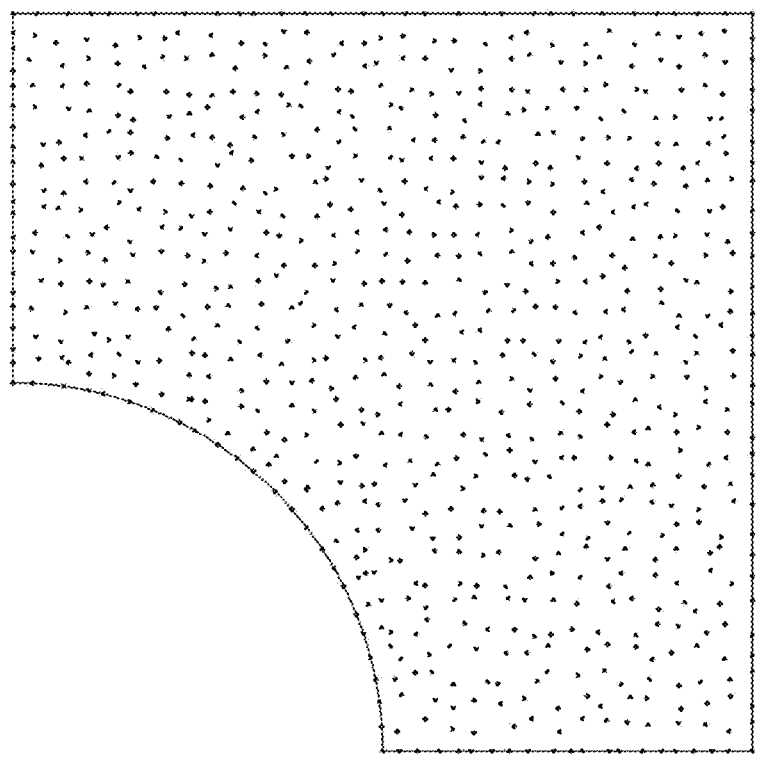
FIG. 7 is a schematic diagram of another structure and points randomly distributed therein provided by the present disclosure.

For a structure shown in FIG. 7, the following steps are performed.

Step C11: The structure is divided into several subdomains according to points randomly distributed in the structure.

Step C12: the support domain of each point is determined, and expressions of trial and test functions in each subdomain in the structure are calculated by using a weighted least square method.

The expression of the trial function is $u^h = Nu_E$, N is a shape function, and $u_E$ is a point displacement.

The expression of the test function is $v = Nv_E$, which has the same shape function N as the trial function.

Step C13: numerical flux corrections are introduced to obtain the Galerkin weak form with numerical flux corrections.

Step C14: The trial and test functions in each subdomain are substituted into the Galerkin weak form with the numerical flux corrections, namely, the formula (7); and then numerical integration is performed by means of Gaussian integration to obtain a point stiffness matrix $K_E$ and an internal-boundary stiffness matrix $K_h$. Because the trial and test functions are both polynomial functions, by use of Gaussian integration to carry out numerical integration, the point stiffness matrix $K_E$ and the internal-boundary stiffness matrix $K_h$ can be rapidly and accurately calculated.

Step C15: A global stiffness matrix K of the structure is obtained by assembling all of the point stiffness matrices $K_E$ and the internal-boundary stiffness matrices $K_h$, and the following system of algebraic equations is obtained according to a given load vector: Kq=Q, where Q is the given load vector and q is a point displacement vector.

The point displacement vector q is calculated by strongly imposing displacement boundary conditions, and then is substituted back into the expression of the trial function, to obtain a displacement field of the structure.

A stress field of the structure is obtained according to the relationship between the displacement field and the stress field.

Figure 8:
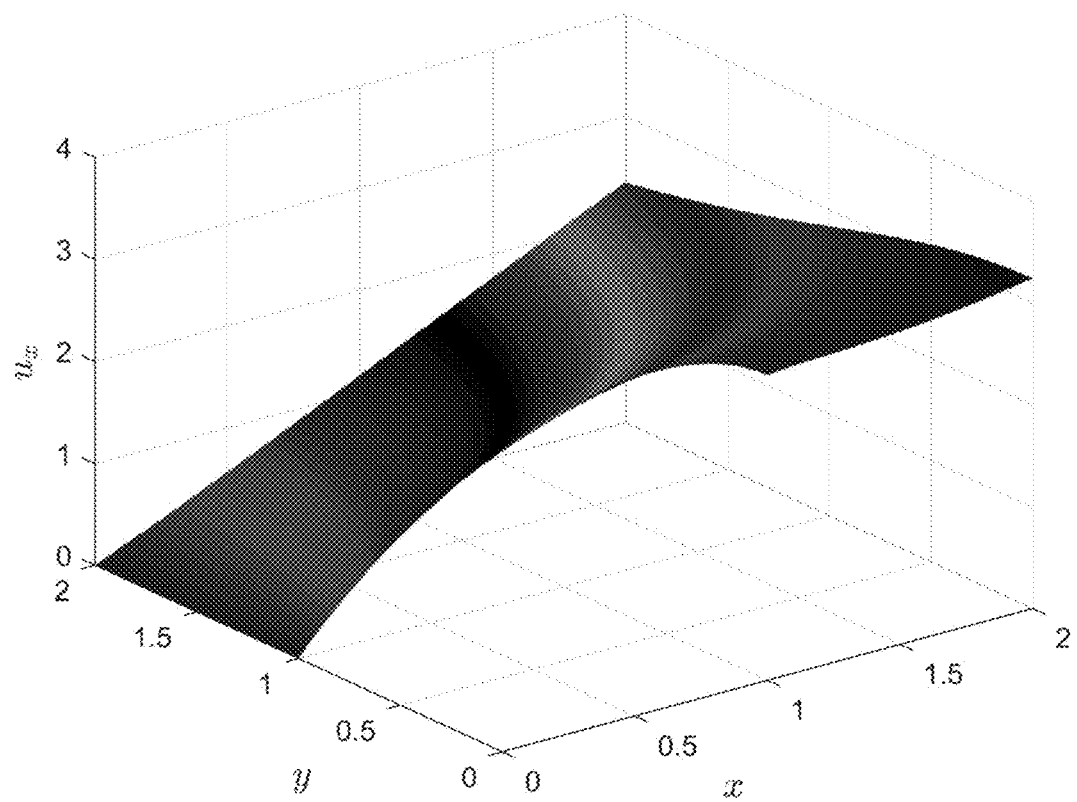
FIG. 8 is a schematic diagram of a displacement field of the structure in FIG. 7 in x direction.
Figure 9:
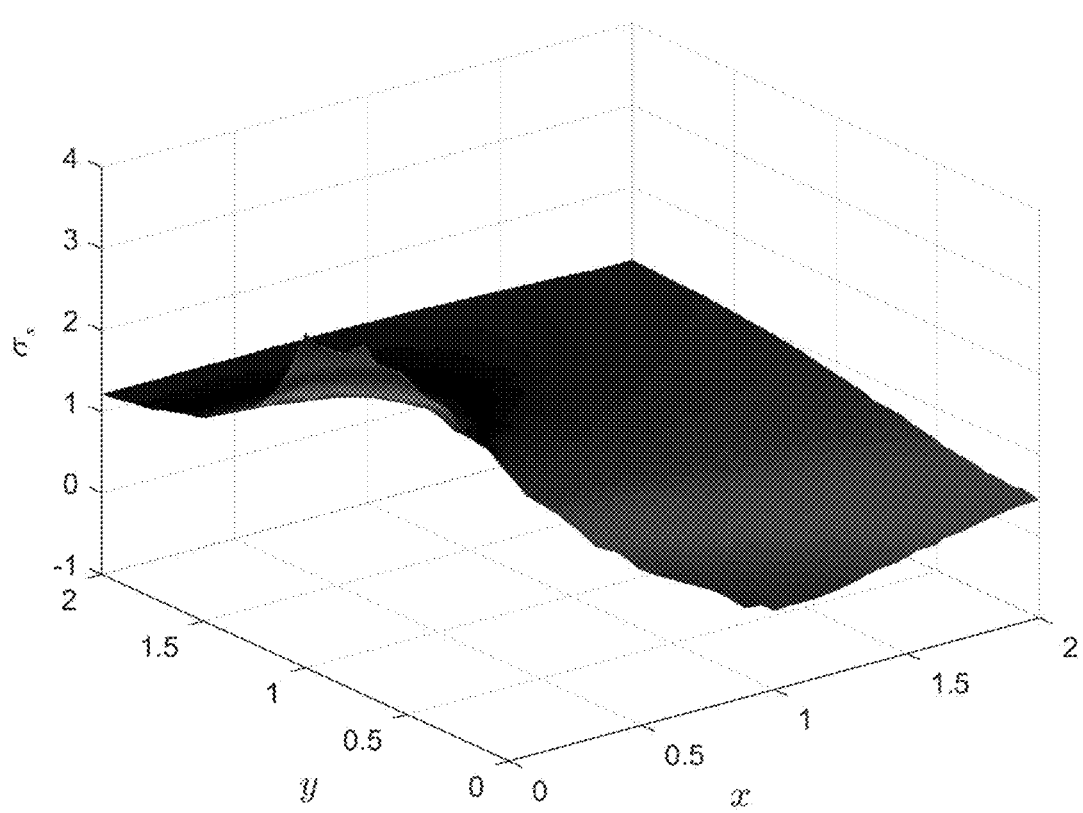
FIG. 9 is a schematic diagram of a stress field of the structure in FIG. 7 in x direction.

For example, a displacement field of the structure in FIG. 7 in x direction is shown in FIG. 8, and a stress field thereof in x direction is shown in FIG. 9. By comparison between the foregoing simulation results and exact solution in theory, the relative error of the displacement field is 0.051% and that of the stress field is 2.064%.

Embodiment 2

Figure 10:
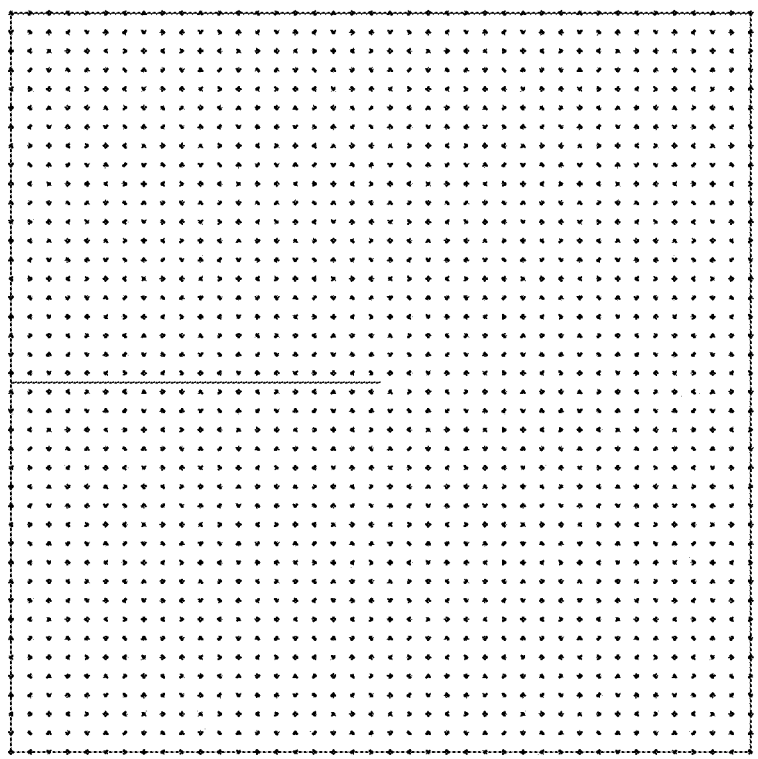
FIG. 10 is a schematic diagram of a plate with a crack and points evenly distributed therein provided by the present disclosure.

For a plate with a crack in FIG. 10, the following steps are performed:

Step C21: The structure is divided into several subdomains by means of the identical subdomain division method.

Figure 11:
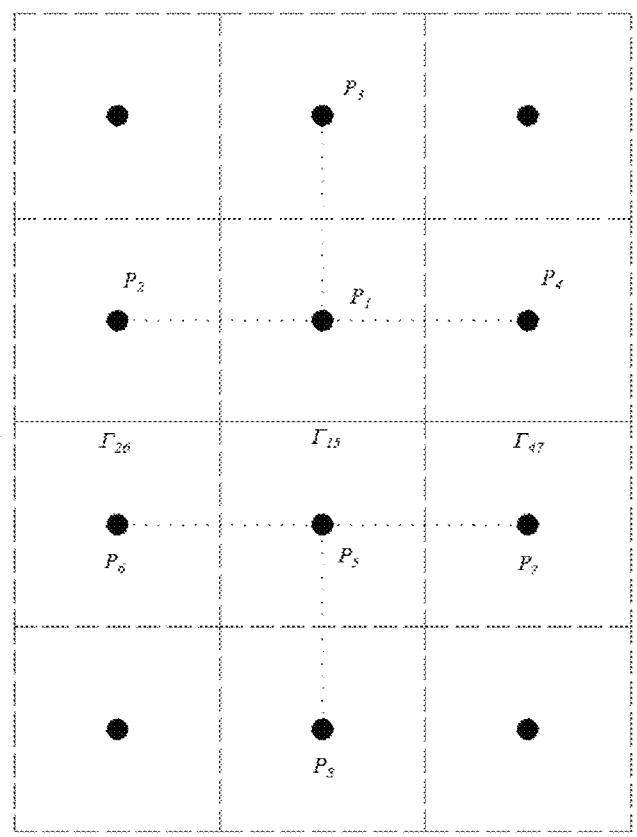
FIG. 11 is a schematic diagram of support domains of points $P_1$ and $P_5$ respectively located at two sides of the crack and free boundaries therebetween provided by the present disclosure.

Step C22: the support domain of each point is determined. Because there is a crack in the structure, it is assumed that points located on one side of the crack are not contained in the support domain of points on the other side of the crack. As shown in FIG. 11, the support domain of the point $P_1$ does not contain the point $P_5$, and the support domain of the point $P_5$ does not contain the point $P_1$.

Moreover, boundaries that coincide with the crack are set as traction-free boundaries. As shown in FIG. 11, boundaries $\Gamma_{26}$, $\Gamma_{15}$, and $\Gamma_{47}$ are all traction-free boundaries.

Step C23: The following expression of the trial function in each subdomain is calculated by using a weighted least square method: $u^h = Nu_E$, where N is a shape function and $u_E$ is a point displacement.

An expression of the test function is $v = Nv_E$, which has the same shape function as the trial function.

Step C24: The trial and test functions in each subdomain are substituted into the Galerkin weak form with the numerical flux corrections, namely, the formula (7); and then numerical integration is performed by means of Gaussian integration to obtain a point stiffness matrix $K_E$ and an internal-boundary stiffness matrix $K_h$.

A global stiffness matrix K is obtained by assembling all of the point stiffness matrices $K_E$ and the internal-boundary stiffness matrices $K_h$, and the following system of algebraic equations is obtained according to a current load vector: Kq=Q, where Q is the current load vector and q is a point displacement vector.

The point displacement vector q is calculated by strongly imposing displacement boundary conditions, and then is substituted back into the expression of the trial function, to obtain the displacement field of the structure.

The stress field of the structure is obtained according to the relationship between the displacement field and the stress field.

Figure 12:
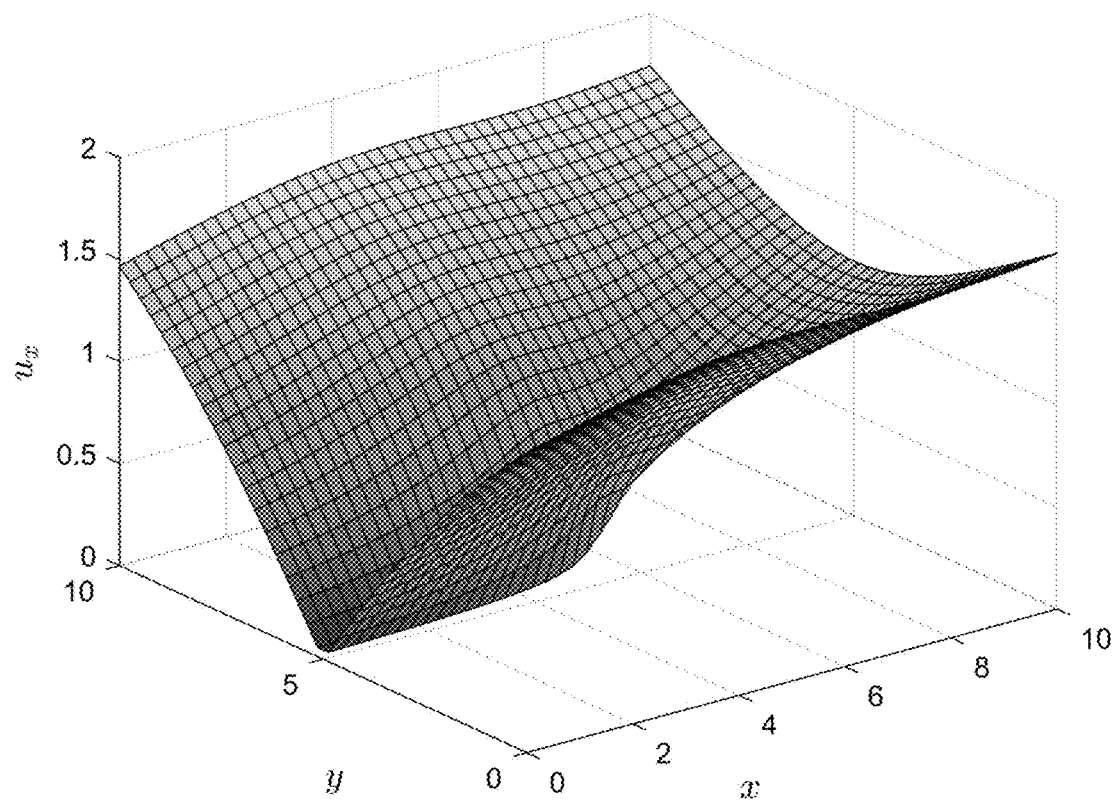
FIG. 12 is a schematic diagram of a displacement field of the plate with a crack in FIG. 10 in x direction.
Figure 13:
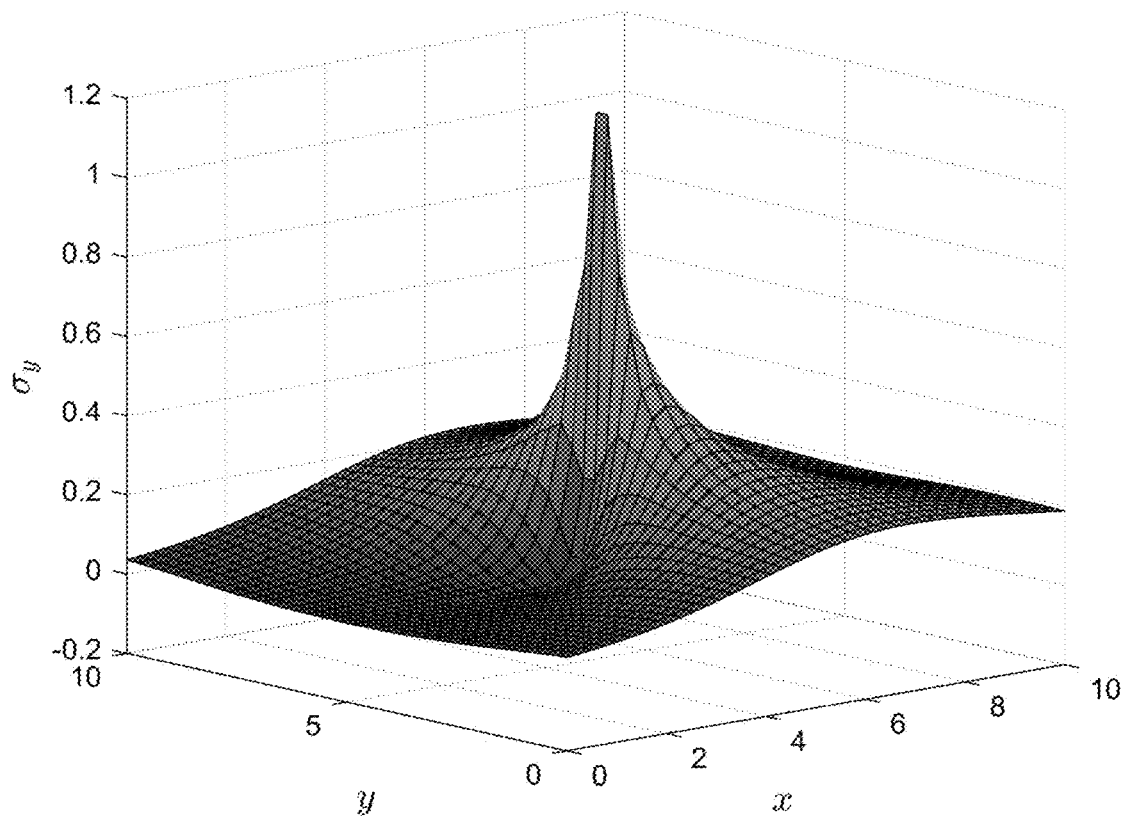
FIG. 13 is a schematic diagram of a stress field of the plate with a crack in FIG. 10 in y direction.

A displacement field of the plate with a crack in FIG. 10 in x direction is shown in FIG. 12, and a stress field thereof in y direction is shown in FIG. 13. An error between a stress intensity factor calculated by using a J integral in the present disclosure and an exact value in theory is 0.83%.

In addition, the structure in a working status may not only be subjected to a static load, but may also experience a load history. The load history herein includes a series of loads in chronological order. In this case, the load history may be divided into m load steps, and the method is performed in each load step. Afterwards, according to the calculated deformation and stress of each position in the structure, it is determined, according to a certain criterion, whether there is a crack between neighboring subdomains in the structure. Thus, rupture and fragmentation of the structure under the effect of a certain load history can be simulated.

For the static load which refers to that the structure is subjected to only one load in a working status, by using the meshless method for solid mechanics simulation provided by the present disclosure, deformation and stress of each position in the structure can be obtained, completing simulation for the structure.

Figure 6:
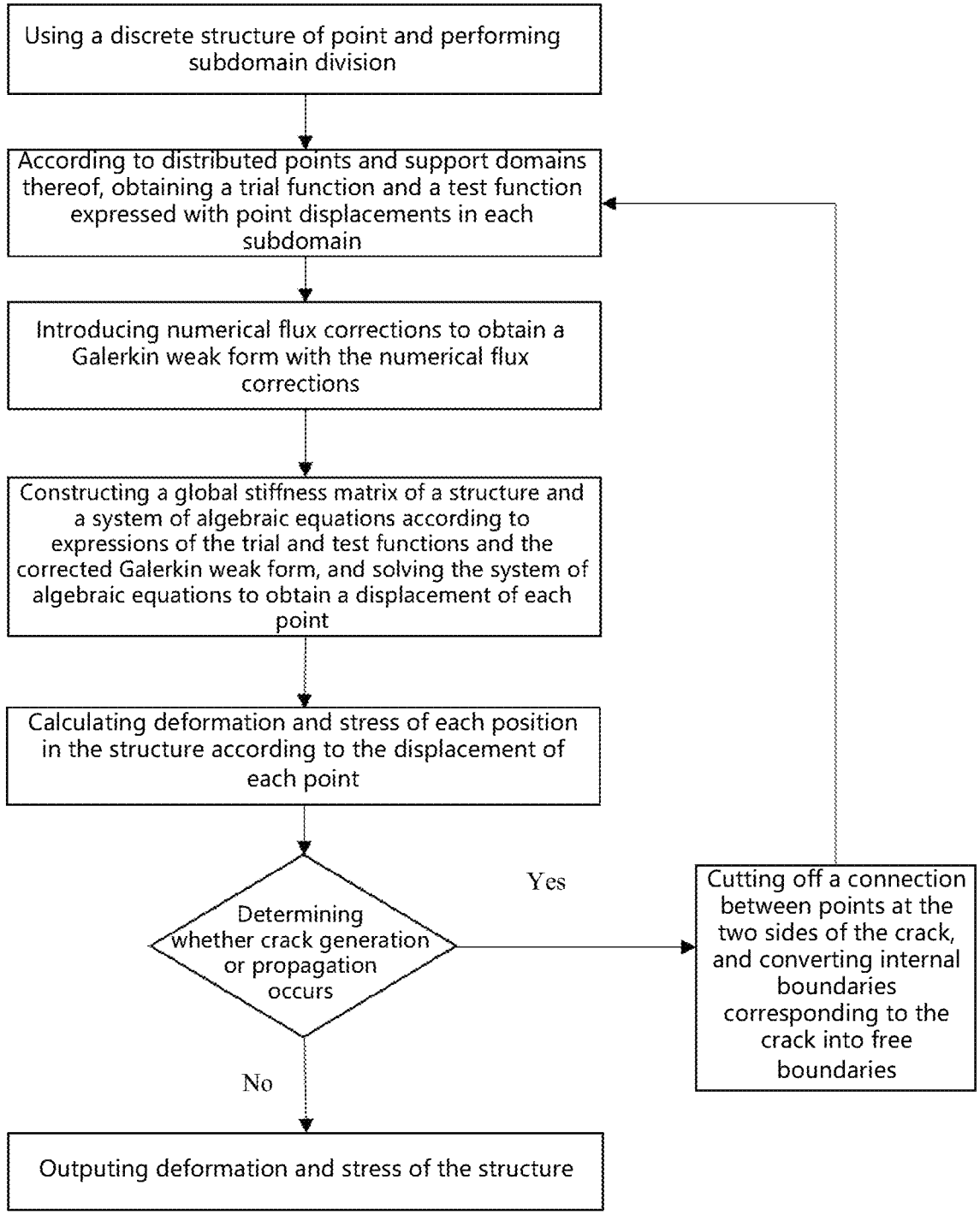
FIG. 6 is a flowchart of a meshless method for solid mechanics simulation provided by the present disclosure.

For the load history which refers to that the structure is subjected to a series of loads in chronological order in a working status, the steps in the meshless method for solid mechanics simulation provided by the present disclosure are performed under each of the chronologically arranged loads successively, to obtain deformation and stress of each position in the structure; and then it is determined, according to a certain criterion, whether there is a crack between neighboring subdomains in the structure under a corresponding load. Thus, rupture and fragmentation of the structure under the effect of the load history can be simulated, as shown in FIG. 6.

The present disclosure achieves the following technical effects compared to the prior art:

1. The present disclosure provides polynomial and discontinuous trial and test functions.

The present disclosure divides a structure into several subdomains by means of novel point-based interpolation, and then calculates the trial function and the test function of each subdomain. Thus, the resultant trial function and test function are both polynomial functions in each subdomain. Because the trial function and the test function have different values on the common boundary between neighboring subdomains, the trial and test functions of each subdomain are discontinuous among different subdomains.

2. The present disclosure further corrects the existing Galerkin weak form. Inconsistency of numerical results that is caused by discontinuity of the trial and test functions provided by the present disclosure is resolved by introducing numerical flux corrections.

3. Because the trial and test functions are polynomial functions in the present disclosure, a stiffness matrix of the structure is calculated by means of Gaussian integration or an analytical method, so that integrals can be computed rapidly, easily, and accurately.

4. The present disclosure makes for a symmetric, sparse and positive definite global stiffness matrix, thus being applicable to large-scale structural simulation.

5. Due to the discontinuity of the trial and test functions, the present disclosure can easily cut off the connection between points, and further can easily and efficiently simulate crack generation and propagation, and rupture and fragmentation of a structure according to a certain criterion for cracking.

The present disclosure further provides an electronic device, which includes a memory, a processor, and a computer program stored in the memory and executable in the processor. The processor implements the steps in the meshless method for solid mechanics simulation described in the specification when executing the program.

The present disclosure further provides a computer-readable storage medium which stores a computer program. When executed by a processor, the computer program implements the steps in the meshless method for solid mechanics simulation described in the specification.

The above merely describes preferred embodiments of the present disclosure, and is not intended to limit the scope of protection of the present disclosure. Any non-substantial changes and replacements made on the basis of the present disclosure by persons skilled in the art all fall within the scope of protection of the present disclosure.

What is claimed is:

1. A meshless method for solid mechanics simulation, configured for calculating deformation and stress of a solid structure of a given shape, comprising the following steps:

a step of constructing a trial function and a test function executed by a processor of an electronic device, wherein obtaining expressions of the trial function and the test function with point displacements in each subdomain of the solid structure of a given shape according to points distributed in the solid structure of a given shape, wherein the trial function and the test function of neighboring subdomains of the solid structure of a given shape are discontinuous;

a step of developing a Galerkin weak form executed by the processor of the electronic device, wherein introducing numerical flux corrections to obtain the Galerkin weak form with the numerical flux corrections;

a step of generating and solving a system of algebraic equations executed by the processor of the electronic device, wherein constructing a global stiffness matrix of the solid structure of a given shape and the system of algebraic equations according to the expressions of the trial function and test function in each subdomain of the solid structure of a given shape and the Galerkin weak form with the numerical flux corrections, and solving the system of algebraic equations to obtain a displacement of each point; and a step of calculating structural deformation and stress executed by the processor of the electronic device, wherein calculating the deformation and the stress of each position in the solid structure of a given shape according to the displacement of each point, to complete simulation and analysis of the solid structure of a given shape;

wherein, the method further comprising:

a simulating step, executed by the processor of the electronic device, for according to a sequence of loads in chronological order, performing the step of constructing a trial function and a test function, the step of developing a Galerkin weak form, the step of generating and solving a system of algebraic equations, and the step of calculating structural deformation and stress under each load successively, to obtain the deformation and stress of each position in the solid structure of a given shape; and determining, according to a certain criterion, whether there is a crack between neighboring subdomains in the solid structure of a given shape, to simulate rupture and fragmentation of the solid structure of a given shape under the effect of the sequence of loads in chronological order.

2. The meshless method for solid mechanics simulation according to claim 1, wherein each subdomain contains one point.

3. The meshless method for solid mechanics simulation according to claim 2, wherein a process of constructing the trial function and the test function is as follows:

step S11: first defining the trial function in each subdomain and recording the trial function as $u^h$, wherein the trial function is an nth-order polynomial function, and n is a natural number greater than or equal to 1 and often equal to 1; and performing nth-order Taylor expansion on the trial function at a point $P_0$, as shown in the following formula (1):

$$u^h(x, y) = \begin{bmatrix} u_x^h \\ u_y^h \end{bmatrix} = \begin{bmatrix} u_x^0 + \frac{\partial u_x}{\partial x}\Big|_{P_0}(x-x_0) + \frac{\partial u_x}{\partial y}\Big|_{P_0}(y-y_0) + \ldots + \\ \frac{1}{n!}\frac{\partial^n u_x}{\partial y^n}(y-y_0)^n \\ u_y^0 + \frac{\partial u_y}{\partial x}\Big|_{P_0}(x-x_0) + \frac{\partial u_y}{\partial y}\Big|_{P_0}(y-y_0) + \ldots + \\ \frac{1}{n!}\frac{\partial^n u_y}{\partial y^n}(y-y_0)^n \end{bmatrix}, \quad (1)$$

wherein $[u_x^0 \ u_y^0]^T$ is value of the displacement $u^h$ at the point $P_0$, and $$a = \begin{bmatrix} \frac{\partial u_x}{\partial x}\Big|_{P_0} & \frac{\partial u_x}{\partial y}\Big|_{P_0} & \cdots & \frac{\partial^n u_x}{\partial y^n}\Big|_{P_0} & \frac{\partial u_y}{\partial x}\Big|_{P_0} & \frac{\partial u_y}{\partial x}\Big|_{P_0} & \cdots & \frac{\partial^n u_y}{\partial y^n}\Big|_{P_0} \end{bmatrix}$$

is a displacement gradient from the first order to the nth order at the point $P_0$, where n is the order of Taylor expansion;

step S12: determining support domain of each subdomain, and defining a weighted discrete $L^2$ norm J, wherein $$J = (Aa + u_0 - u_m)^T W(Aa + u_0 - u_m), \quad (2)$$

$$A = \begin{bmatrix} x_1-x_0 & y_1-y_0 & \cdots & \frac{1}{n!}(y_1-y_0)^n & 0 & 0 & \cdots & 0 \\ 0 & 0 & \cdots & 0 & x_1-x_0 & y_1-y_0 & \cdots & \frac{1}{n!}(y_1-y_0)^n \\ x_2-x_0 & y_2-y_0 & \cdots & \frac{1}{n!}(y_2-y_0)^n & 0 & 0 & \cdots & 0 \\ 0 & 0 & \cdots & 0 & x_2-x_0 & y_2-y_0 & \cdots & \frac{1}{n!}(y_2-y_0)^n \\ \vdots & \vdots & \vdots & \vdots & \vdots & \vdots & \vdots & \vdots \\ x_m-x_0 & y_m-y_0 & \cdots & \frac{1}{n!}(y_m-y_0)^n & 0 & 0 & \cdots & 0 \\ 0 & 0 & \cdots & 0 & x_m-x_0 & y_m-y_0 & \cdots & \frac{1}{n!}(y_m-y_0)^n \end{bmatrix}$$

$$u_0 = \left([u_x^0 \ u_y^0 \ u_x^0 \ u_y^0 \ \cdots \ u_x^0 \ u_y^0]_{1\times 2m}\right)^T,$$

$$u_m = [u_x^1 \ u_y^1 \ u_x^2 \ u_y^2 \ \cdots \ u_x^m \ u_y^m]^T,$$

$$W = \begin{bmatrix} w_x^1 & 0 & 0 & \ldots & 0 \\ 0 & w_y^1 & \ddots & \ddots & \vdots \\ 0 & \ddots & \ddots & \ddots & 0 \\ \vdots & \ddots & \ddots & w_x^m & 0 \\ 0 & \ldots & 0 & 0 & w_y^m \end{bmatrix},$$

$(x_i, y_i)$ is coordinates of a point $P_i$, $[u_x^i \; u_y^i]^T$ is value of the displacement $u^h$ at the point $P_i$, and $[w_x^i \; w_y^i]^T$; is value of a weight function at the point $P_i$, (i=1, 2, 3, . . . m);

step S13: expressing the displacement gradient a with the point displacement according to the formula (2) and stationary conditions of the norm J, that is:

$$a = Cu_E, \quad (3)$$

wherein $C = (A^T W A)^{-1} A^T W [I_1 \; I_2]$, $$u_E = [u_x^0 \; u_y^0 \; u_x^1 \; u_y^1 \; \ldots \; u_x^m \; u_y^m]^T,$$

$$I_1 = \begin{bmatrix} -1 & 0 \\ 0 & -1 \\ -1 & 0 \\ 0 & -1 \\ \vdots & \vdots \\ -1 & 0 \\ 0 & -1 \end{bmatrix}_{2m \times 2}, \text{ and } I_2 = \begin{bmatrix} 1 & 0 & \ldots & 0 \\ 0 & 1 & \ddots & \vdots \\ \vdots & \ddots & \ddots & 0 \\ 0 & \ldots & 0 & 1 \end{bmatrix}_{2m \times 2m};$$

step S14: obtaining the expression of the trial function in each subdomain according to formulae (3) and (1); and $$u^h = Nu_E$$

$$\varepsilon^h = \begin{bmatrix} \varepsilon_{11}^h \\ \varepsilon_{22}^h \\ 2\varepsilon_{12}^h \end{bmatrix} = \begin{bmatrix} \frac{\partial}{\partial x_1} & 0 \\ 0 & \frac{\partial}{\partial x_2} \\ \frac{\partial}{\partial x_2} & \frac{\partial}{\partial x_1} \end{bmatrix} u^h = Bu_E,$$

$$\sigma^h = \begin{bmatrix} \sigma_{11}^h \\ \sigma_{22}^h \\ \sigma_{12}^h \end{bmatrix} = D\varepsilon^h = DBu_E$$

N is the shape function; D is the stress-strain matrix; B is the derivative of shape function; $\varepsilon^h$ is the strain and $\sigma^h$ is the stress;

step S15: obtaining the expression of the test function by prescribing the test function in a same form as that of the trial function.

4. The meshless method for solid mechanics simulation according to claim 3, wherein a definition of the support domain comprises any one of the following manners: defining the support domain of each point to contain all subdomains having points adjacent to the corresponding point located therein, or defining the support domain of each point to contain all subdomains having points therein which are located in a circle of a particular size and with the corresponding point at a center; and if a crack exists between two neighboring subdomains, the point located on one side of the crack is not contained in the support domain of the point on the other side of the crack.

5. The meshless method for solid mechanics simulation according to claim 1, wherein the numerical flux corrections comprise interior penalty numerical flux corrections.

6. The meshless method for solid mechanics simulation according to claim 3, wherein the generating and solving step of the system of algebraic equations further comprises:

step S21: substituting the trial function and test function in each subdomain into the Galerkin weak form corrected by numerical fluxes, to obtain a point stiffness matrix and an internal-boundary stiffness matrix, wherein the point stiffness matrix is $K_E = \int_E B^T D B d\Omega$, the internal-boundary stiffness matrix is $$K_h = -\int_e [N^T]\{n_e DB\} d\Gamma - \int_e \{B^T D n_e^T\}[N] d\Gamma + \frac{\eta}{h_e} \int_e [N^T][N] d\Gamma_t,$$

and e is a common boundary between neighboring subdomains;

step S22: obtaining a global stiffness matrix K by assembling all the point stiffness matrices and the internal-boundary stiffness matrices, to obtain the following system of algebraic equations in a matrix form: Kq=Q, wherein q is a point displacement vector, and Q is a load vector; and step S23: solving the system of algebraic equations according to the global stiffness matrix and the load vector to obtain the point displacement vector of the solid structure of a given shape, thus finally obtaining the displacement of each position in the solid structure of a given shape.

7. An electronic device, comprising a memory, a processor, and a computer program stored in the memory and executable in the processor, wherein the processor implements the following steps when executing the program a step of constructing a trial function and a test function, wherein obtaining expressions of the trial function and the test function with point displacements in each subdomain according to points distributed in a solid structure of a given shape, wherein the trial function and the test function of neighboring subdomains of the solid structure of a given shape are discontinuous;

a step of developing a Galerkin weak form, wherein introducing numerical flux corrections to obtain the Galerkin weak form with the numerical flux corrections;

a step of generating and solving a system of algebraic equations, wherein constructing a global stiffness matrix of the solid structure of a given shape and the system of algebraic equations according to the expressions of the trial function and test function in each subdomain and the Galerkin weak form with the numerical flux corrections, and solving the system of algebraic equations to obtain a displacement of each point; and a step of calculating structural deformation and stress, wherein calculating the deformation and the stress of each position in the solid structure of a given shape according to the displacement of each point, to complete simulation and analysis of the structure;

a simulating step for according to a sequence of loads in chronological order, performing the step of constructing a trial function and a test function, the step of developing a Galerkin weak form, the step of generating and solving a system of algebraic equations, and the step of calculating structural deformation and stress under each load successively, to obtain the deformation and stress of each position in the solid structure of a given shape; and determining, according to a certain criterion, whether there is a crack between neighboring subdomains in the solid structure of a given shape, to simulate rupture and fragmentation of the solid structure of a given shape under the effect of the sequence of loads in chronological order.

8. The electronic device according to claim 7, wherein each subdomain contains one point.

9. The electronic device according to claim 8, wherein a process of constructing the trial function and the test function is as follows:

step S11: first defining the trial function in each subdomain and recording the trial function as $u^h$, wherein the trial function is an nth-order polynomial function, and n is a natural number greater than or equal to 1 and often equal to 1; and performing nth-order Taylor expansion of the trial function at a point $P_0$, as shown in the following formula (1):

$$u^h(x, y) = \begin{bmatrix} u_x^h \\ u_y^h \end{bmatrix} = \begin{bmatrix} u_x^0 + \frac{\partial u_x}{\partial x}\Big|_{P_0}(x-x_0) + \frac{\partial u_x}{\partial y}\Big|_{P_0}(y-y_0) + \ldots + \\ \frac{1}{n!}\frac{\partial^n u_x}{\partial y^n}(y-y_0)^n \\ u_y^0 + \frac{\partial u_y}{\partial x}\Big|_{P_0}(x-x_0) + \frac{\partial u_y}{\partial y}\Big|_{P_0}(y-y_0) + \ldots + \\ \frac{1}{n!}\frac{\partial^n u_y}{\partial y^n}(y-y_0)^n \end{bmatrix}, \quad (1)$$

wherein $[u_x^0 \ u_y^0]^T$ is value of the displacement $u^h$ at the point $P_0$, and $$a = \begin{bmatrix} \frac{\partial u_x}{\partial x}\Big|_{P_0} & \frac{\partial u_x}{\partial y}\Big|_{P_0} & \ldots & \frac{\partial^n u_x}{\partial y^n}\Big|_{P_0} & \frac{\partial u_y}{\partial x}\Big|_{P_0} & \frac{\partial u_y}{\partial y}\Big|_{P_0} & \ldots & \frac{\partial^n u_y}{\partial y^n}\Big|_{P_0} \end{bmatrix}$$

is a displacement gradient from the first order to the nth order at the point $P_0$, where n is the order of Taylor expansion;

step S12: determining support domain of each subdomain, and defining a weighted discrete $L^2$ norm J, wherein $$J = (Aa + u_0 - u_m)^T W (Aa + u_0 - u_m), \quad (2)$$

$$A = \begin{bmatrix} x_1-x_0 & y_1-y_0 & \ldots & \frac{1}{n!}(y_1-y_0)^n & 0 & 0 & \ldots & 0 \\ 0 & 0 & \ldots & 0 & x_1-x_0 & y_1-y_0 & \ldots & \frac{1}{n!}(y_1-y_0)^n \\ x_2-x_0 & y_2-y_0 & \ldots & \frac{1}{n!}(y_2-y_0)^n & 0 & 0 & \ldots & 0 \\ 0 & 0 & \ldots & 0 & x_2-x_0 & y_2-y_0 & \ldots & \frac{1}{n!}(y_2-y_0)^n \\ \vdots & \vdots & \vdots & \vdots & \vdots & \vdots & \vdots & \vdots \\ x_m-x_0 & y_m-y_0 & \ldots & \frac{1}{n!}(y_m-y_0)^n & 0 & 0 & \ldots & 0 \\ 0 & 0 & \ldots & 0 & x_m-x_0 & y_m-y_0 & \ldots & \frac{1}{n!}(y_m-y_0)^n \end{bmatrix}$$

$$u_0 = \left( \begin{bmatrix} u_x^0 & u_y^0 & u_x^0 & u_y^0 & \ldots & u_x^0 & u_y^0 \end{bmatrix}_{1 \times 2m} \right)^T,$$

$$u_m = \begin{bmatrix} u_x^1 & u_y^1 & u_x^2 & u_y^2 & \ldots & u_x^m & u_y^m \end{bmatrix}^T,$$

$$W = \begin{bmatrix} w_x^1 & 0 & 0 & \ldots & 0 \\ 0 & w_y^1 & \ddots & \ddots & \vdots \\ 0 & \ddots & \ddots & \ddots & 0 \\ \vdots & \ddots & \ddots & w_x^m & 0 \\ 0 & \ldots & 0 & 0 & w_y^m \end{bmatrix},$$

$(x_i, y_i)$ is coordinates of a point $P_i$, $[u_x^i \ u_y^i]^T$ is value of the displacement $u^h$ at the point $P_i$, and $[w_x^i \ w_y^i]^T$ is value of a weight function at the point $P_i$, ($i=1, 2, 3, \ldots m$);

step S13: expressing the displacement gradient a with point displacements according to the formula (2) and stationary conditions of the norm J, that is:

$$a = Cu_E, \quad (3)$$

wherein $C = (A^T W A)^{-1} A^T W [I_1 \ I_2]$, $u_E = [u_x^0 \ u_y^0 \ u_x^1 \ u_y^1 \ \ldots \ u_x^m \ u_y^m]^T$, $$I_1 = \begin{bmatrix} -1 & 0 \\ 0 & -1 \\ -1 & 0 \\ 0 & -1 \\ \vdots & \vdots \\ -1 & 0 \\ 0 & -1 \end{bmatrix}_{2m \times 2}, \text{ and } I_2 = \begin{bmatrix} 1 & 0 & \ldots & 0 \\ 0 & 1 & \ddots & \vdots \\ \vdots & \ddots & \ddots & 0 \\ 0 & \ldots & 0 & 1 \end{bmatrix}_{2m \times 2m};$$

step S14: obtaining the expression of the trial function in each subdomain according to formulae (3) and (1); and $$u^h = N u_E$$

$$\varepsilon^h = \begin{bmatrix} \varepsilon_{11}^h \\ \varepsilon_{22}^h \\ 2\varepsilon_{12}^h \end{bmatrix} = \begin{bmatrix} \frac{\partial}{\partial x_1} & 0 \\ 0 & \frac{\partial}{\partial x_2} \\ \frac{\partial}{\partial x_2} & \frac{\partial}{\partial x_1} \end{bmatrix} u^h = B u_E,$$

$$\sigma^h = \begin{bmatrix} \sigma_{11}^h \\ \sigma_{22}^h \\ \sigma_{12}^h \end{bmatrix} = D \varepsilon^h = D B u_E$$

N is the shape function; D is the stress-strain matrix; B is the derivative of shape function; $\varepsilon^h$ is the strain and $\sigma^h$ is the stress;

step S15: obtaining the expression of the test function by prescribing the test function in a same form as that of the trial function.

10. The electronic device according to claim 9, wherein a definition of the support domain comprises any one of the following manners: defining the support domain of each point to contain all subdomains having points adjacent to the corresponding point located therein, or defining the support domain of each point to contain all subdomains having points therein which are located in a circle of a particular size and with the corresponding point at a center; and if a crack exists between two neighboring subdomains, the point located on one side of the crack is not contained in the support domain of the point on the other side of the crack.

11. The electronic device according to claim 9, wherein the step of generating and solving the system of algebraic equations further comprises:

step S21: substituting the trial function and test function in each subdomain into the Galerkin weak form corrected by numerical fluxes, to obtain a point stiffness matrix and an internal-boundary stiffness matrix, wherein the point stiffness matrix is $K_E = \int_E B^T D B d\Omega$, the internal-boundary stiffness matrix is $$K_h = -\int_e [N^T]\{n_e DB\} d\Gamma - \int_e \{B^T D n_e^T\}[N] d\Gamma + \frac{\eta}{h_e} \int_e [N^T][N] d\Gamma_t,$$

and e is a common boundary between subdomains;

step S22: obtaining a global stiffness matrix K by assembling all the point stiffness matrices and the internal-boundary stiffness matrices, to obtain the following system of algebraic equations in a matrix form: Kq=Q, wherein q is a point displacement vector, and Q is a load vector; and step S23: solving the system of algebraic equations according to the global stiffness matrix and the load vector to obtain the point displacement vector of the solid structure of a given shape, thus finally obtaining the displacement of each position in the solid structure of a given shape.

12. The electronic device according to claim 7, wherein the numerical flux corrections comprise interior penalty numerical flux corrections.

13. A non-transitory computer-readable storage medium which stores a computer program, wherein when executed by a processor, the computer program implements the following steps a step of constructing a trial function and a test function, wherein obtaining expressions of the trial function and the test function with point displacements in each subdomain according to points distributed in a solid structure of a given shape, wherein the trial function and the test function of neighboring subdomains of the solid structure of a given shape are discontinuous;

a step of developing a Galerkin weak form, wherein introducing numerical flux corrections to obtain the Galerkin weak form with the numerical flux corrections;

a step of generating and solving a system of algebraic equations, wherein constructing a global stiffness matrix of the solid structure of a given shape and the system of algebraic equations according to the expressions of the trial function and test function in each subdomain and the Galerkin weak form with the numerical flux corrections, and solving the system of algebraic equations to obtain a displacement of each point; and a step of calculating structural deformation and stress, wherein calculating the deformation and the stress of each position in the solid structure of a given shape according to the displacement of each point, to complete simulation and analysis of the solid structure of a given shape;

wherein, a simulating step for according to a sequence of loads in chronological order, performing the step of constructing a trial function and a test function, the step of developing a Galerkin weak form, the step of generating and solving a system of algebraic equations, and the step of calculating structural deformation and stress under each load successively, to obtain the deformation and stress of each position in the solid structure of a given shape; and determining, according to a certain criterion, whether there is a crack between neighboring subdomains in the solid structure of a given shape, to simulate rupture and fragmentation of the solid structure of a given shape under the effect of the sequence of loads in chronological order.

14. The non-transitory computer-readable storage medium according to claim 13, wherein each subdomain contains one point.

15. The non-transitory computer-readable storage medium according to claim 14, wherein a process of constructing the trial function and the test function is as follows:

step S11: first defining the trial function in each subdomain and recording the trial function as $u^h$, wherein the trial function is an nth-order polynomial function, and n is a natural number greater than or equal to 1 and often equal to 1; and performing nth-order Taylor expansion of the trial function at a point $P_0$, as shown in the following formula (1):

$$u^h(x,y) = \begin{bmatrix} u_x^h \\ u_y^h \end{bmatrix} = \begin{bmatrix} u_x^0 + \frac{\partial u_x}{\partial x}\Big|_{P_0}(x-x_0) + \frac{\partial u_x}{\partial y}\Big|_{P_0}(y-y_0) + \ldots + \\ \frac{1}{n!}\frac{\partial^n u_x}{\partial y^n}(y-y_0)^n \\ u_y^0 + \frac{\partial u_y}{\partial x}\Big|_{P_0}(x-x_0) + \frac{\partial u_y}{\partial y}\Big|_{P_0}(y-y_0) + \ldots + \\ \frac{1}{n!}\frac{\partial^n u_y}{\partial y^n}(y-y_0)^n \end{bmatrix}, \quad (1)$$

wherein $[u_x^0\ u_y^0]^T$ is value of the displacement $u^h$ at the point $P_0$, and $$a = \begin{bmatrix} \frac{\partial u_x}{\partial x}\Big|_{P_0} & \frac{\partial u_x}{\partial y}\Big|_{P_0} & \cdots & \frac{\partial^n u_x}{\partial y^n} & \frac{\partial u_y}{\partial x}\Big|_{P_0} & \frac{\partial u_y}{\partial x}\Big|_{P_0} & \cdots & \frac{\partial^n u_y}{\partial y^n} \end{bmatrix}\Big|_{P_0}$$

is a displacement gradient from the first order to the nth order at the point $P_0$, where n is the order of Taylor expansion;

step S12: determining support domain of each subdomain, and defining a weighted discrete $L^2$ norm J, wherein $$J = (Aa + u_0 - u_m)^T W(Aa + u_0 - u_m), \quad (2)$$

$$A = \begin{bmatrix} x_1-x_0 & y_1-y_0 & \cdots & \frac{1}{n!}(y_1-y_0)^n & 0 & 0 & \cdots & 0 \\ 0 & 0 & \cdots & 0 & x_1-x_0 & y_1-y_0 & \cdots & \frac{1}{n!}(y_1-y_0)^n \\ x_2-x_0 & y_2-y_0 & \cdots & \frac{1}{n!}(y_2-y_0)^n & 0 & 0 & \cdots & 0 \\ 0 & 0 & \cdots & 0 & x_2-x_0 & y_2-y_0 & \cdots & \frac{1}{n!}(y_2-y_0)^n \\ \vdots & \vdots & \vdots & \vdots & \vdots & \vdots & \vdots & \vdots \\ x_m-x_0 & y_m-y_0 & \cdots & \frac{1}{n!}(y_m-y_0)^n & 0 & 0 & \cdots & 0 \\ 0 & 0 & \cdots & 0 & x_m-x_0 & y_m-y_0 & \cdots & \frac{1}{n!}(y_m-y_0)^n \end{bmatrix}$$

$$u_0 = \left( \begin{bmatrix} u_x^0 & u_y^0 & u_x^0 & u_y^0 & \cdots & u_x^0 & u_y^0 \end{bmatrix}_{1 \times 2m} \right)^T,$$

$$u_m = \begin{bmatrix} u_x^1 & u_y^1 & u_x^2 & u_y^2 & \cdots & u_x^m & u_y^m \end{bmatrix}^T,$$

$$W = \begin{bmatrix} w_x^1 & 0 & 0 & \cdots & 0 \\ 0 & w_y^1 & \ddots & \ddots & \vdots \\ 0 & \ddots & \ddots & \ddots & 0 \\ \vdots & \ddots & \ddots & w_x^m & 0 \\ 0 & \cdots & 0 & 0 & w_y^m \end{bmatrix},$$

($x_i$, $y_i$) is coordinates of a point $P_i$, $[u_x^i \; u_y^i]^T$ is value of the displacement $u^h$ at the point $P_i$, and $[w_x^i \; w_y^i]^T$ is value of a weight function at the point $P_i$, (i=1, 2, 3, ... m);

step S13: expressing the displacement gradient a with point displacements according to the formula (2) and stationary conditions of the norm J, that is:

$$a = Cu_E, \quad (3)$$

wherein $C = (A^T W A)^{-1} A^T W [I_1 \; I_2]$, $$u_E = [u_x^0 \; u_y^0 \; u_x^1 \; u_y^1 \; ... \; u_x^m \; u_y^m]^T,$$

$$I_1 = \begin{bmatrix} -1 & 0 \\ 0 & -1 \\ -1 & 0 \\ 0 & -1 \\ \vdots & \vdots \\ -1 & 0 \\ 0 & -1 \end{bmatrix}_{2m \times 2}, \text{ and } I_2 = \begin{bmatrix} 1 & 0 & \cdots & 0 \\ 0 & 1 & \ddots & \vdots \\ \vdots & \ddots & \ddots & 0 \\ 0 & \cdots & 0 & 1 \end{bmatrix}_{2m \times 2m};$$

step S14: obtaining the expression of the trial function in each subdomain according to formulae (3) and (1); and $$u^h = N u_E$$

$$\varepsilon^h = \begin{bmatrix} \varepsilon_{11}^h \\ \varepsilon_{22}^h \\ 2\varepsilon_{12}^h \end{bmatrix} = \begin{bmatrix} \frac{\partial}{\partial x_1} & 0 \\ 0 & \frac{\partial}{\partial x_2} \\ \frac{\partial}{\partial x_2} & \frac{\partial}{\partial x_1} \end{bmatrix} u^h = B u_E,$$

-continued $$\sigma^h = \begin{bmatrix} \sigma_{11}^h \\ \sigma_{22}^h \\ \sigma_{12}^h \end{bmatrix} = D \varepsilon^h = D B u_E$$

N is the shape function; D is the stress-strain matrix; B is the derivative of shape function; $\varepsilon^h$ is the strain and $\sigma^h$ is the stress;

step S15: obtaining the expression of the test function by prescribing the test function in a same form as that of the trial function.

16. The non-transitory computer-readable storage medium according to claim 15, wherein definition of the support domain comprises any one of the following manners: defining the support domain of each point to contain all subdomains having points adjacent to the corresponding point located therein, or defining the support domain of each point to contain all subdomains having points therein which are located in a circle of a particular size and with the corresponding point at the center; and if a crack exists between two neighboring subdomains, the point located on one side of the crack is not contained in the support domain of the point on the other side of the crack.

17. The non-transitory computer-readable storage medium according to claim 13, wherein the numerical flux corrections comprises interior penalty numerical flux corrections.

\* \* \* \* \*